(12) United States Patent
Mourou et al.

(10) Patent No.: US 8,878,414 B2
(45) Date of Patent: Nov. 4, 2014

(54) STATOR WELD JOINTS AND METHODS OF FORMING SAME

(75) Inventors: Julien P. Mourou, Bloomfield Hills, MI (US); Urban J. De Souza, Rochester Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 272 days.

(21) Appl. No.: 13/570,331

(22) Filed: Aug. 9, 2012

(65) Prior Publication Data

US 2014/0042865 A1 Feb. 13, 2014

(51) Int. Cl.
*H02K 3/04* (2006.01)

(52) U.S. Cl.
USPC .............. 310/208; 310/201; 310/180

(58) Field of Classification Search
USPC .............. 310/180, 45, 184, 208, 201; 29/596, 29/606
See application file for complete search history.

(56) References Cited

U.S. PATENT DOCUMENTS

| | | | | |
|---|---|---|---|---|
| 6,894,415 | B2* | 5/2005 | Koike | 310/184 |
| 6,933,652 | B2* | 8/2005 | Higashino et al. | 310/260 |
| 7,139,633 | B2 | 11/2006 | Mazumder et al. | |
| 7,765,022 | B2 | 7/2010 | Mazumder et al. | |
| 2002/0024266 | A1* | 2/2002 | Asao | 310/201 |
| 2002/0033649 | A1* | 3/2002 | Oohashi et al. | 310/184 |
| 2003/0127934 | A1* | 7/2003 | Koike | 310/201 |
| 2004/0145257 | A1* | 7/2004 | Oohashi | 310/71 |
| 2005/0073209 | A1* | 4/2005 | Koike | 310/201 |
| 2006/0232157 | A1* | 10/2006 | Ooiwa | 310/201 |
| 2012/0181890 | A1* | 7/2012 | Kleber et al. | 310/201 |
| 2013/0106231 | A1* | 5/2013 | Chamberlin et al. | 310/201 |

* cited by examiner

*Primary Examiner* — Thanh Lam
(74) *Attorney, Agent, or Firm* — Quinn Law Group, PLLC

(57) ABSTRACT

A method of forming a weld joint includes removing a portion of an insulator from a first core of a first magnet wire and a second core of a second magnet wire so that the first wire has a first heat affectable zone and a first insulator portion adjacent the first zone, and the second wire has a second heat affectable zone and a second insulator portion adjacent the second zone. The first and second insulator portions include the insulator disposed on the first and second cores, respectively. The first and second zones have a first and second distal end spaced apart from the first and second insulator portions, respectively. The method includes welding together only the first end and the second end to form the weld joint, wherein welding does not transfer heat to the first and second insulator portions sufficient to burn the insulator.

20 Claims, 3 Drawing Sheets

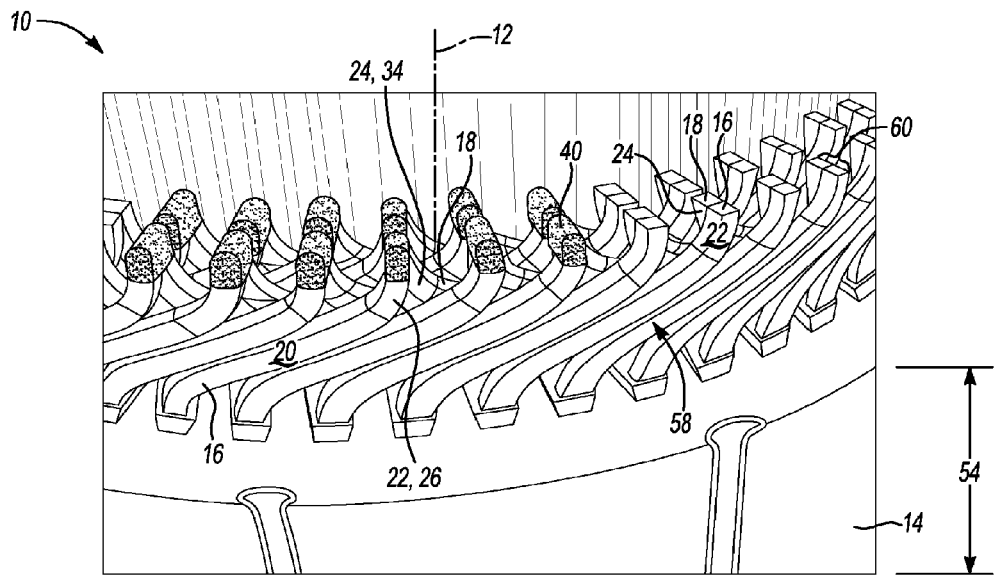
Fig-1
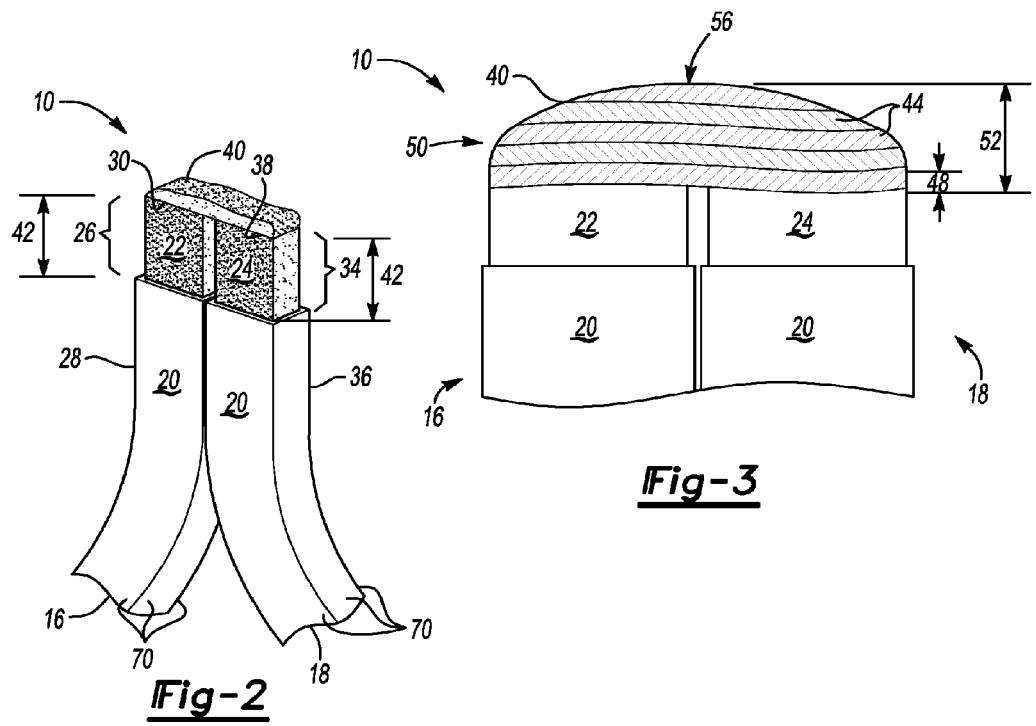
Fig-2
Fig-3

US 8,878,414 B2

STATOR WELD JOINTS AND METHODS OF FORMING SAME

TECHNICAL FIELD

The present disclosure generally relates to stators, and more specifically, to methods of forming a weld joint of a stator.

BACKGROUND

Electromagnetic machines such as electric motors, generators, and traction motors are useful for converting energy from one form to another. Such electromagnetic machines generally include a rotor that is rotatable about an axis of rotation, and a stator that is stationary with respect to the axis of rotation. Energy may be converted via relative rotation between the rotor and stator.

Both stators and rotors may have an annular configuration about the axis of rotation, and, depending upon the intended use of the electromagnetic machine, may be formed by stacking identical thin sheets of magnetic steel adjacent one another to form a lamination stack. One type of stator, a bar-wound stator, may also include a plurality of magnet wires arranged in a specific pattern about the axis of rotation. As electrical current flows through each of the plurality of magnet wires, corresponding sections of the stator are magnetized to thereby cause rotation of the rotor.

SUMMARY

A method of forming a weld joint of a stator includes removing a portion of an insulator from each of a first core of a first magnet wire and a second core of a second magnet wire so that the first magnet wire has a first heat affectable zone and a first insulator portion adjacent the first heat affectable zone, and the second magnet wire has a second heat affectable zone and a second insulator portion adjacent the second heat affectable zone. The first insulator portion includes the insulator disposed on the first core, and the second insulator portion includes the insulator disposed on the second core. Further, the first heat affectable zone has a first distal end spaced apart from the first insulator portion, and the second heat affectable zone has a second distal end spaced apart from the second insulator portion. The method also includes welding together only the first distal end and the second distal end to thereby form the weld joint, wherein welding does not transfer heat to the first insulator portion and the second insulator portion sufficient to burn the insulator.

In one embodiment, the method includes welding together only the first distal end and the second distal end to thereby form the weld joint joining the first magnet wire and the second magnet wire. Welding does not burn the insulator and includes iteratively depositing a weld powder to the first heat affectable zone and the second heat affectable zone at the first distal end and the second distal end, respectively. Welding also includes transferring a first quantity of heat from a diode laser to the weld powder for a first duration of from about 1 second to about 5 seconds, and, after transferring the first quantity of heat, transferring at least a second quantity of heat from the diode laser to the weld powder for a second duration of from about 1 second to about 5 seconds. Welding further includes minimizing each of the first quantity of heat and at least the second quantity of heat. In addition, the method also includes, concurrent to welding, shaping the weld joint to a substantially hemispherical configuration.

A stator includes a first magnet wire having a first core, a first heat affectable zone, and a first insulator portion adjoining the first heat affectable zone and including an insulator disposed on the first core. The stator also includes a second magnet wire having a second core, a second heat affectable zone, and a second insulator portion adjoining the second heat affectable zone and including the insulator disposed on the second core. The first heat affectable zone has a first distal end spaced apart from the first insulator portion, and the second heat affectable zone has a second distal end spaced apart from the second insulator portion. The stator further includes a weld joint joining the first magnet wire and the second magnet wire at only the first distal end and the second distal end, respectively, such that the insulator is not burned.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 1 is a schematic perspective illustration of a stator including a weld joint;

FIG. 2 is a schematic perspective fragmentary illustration of the weld joint of FIG. 1;

FIG. 3 is a schematic fragmentary illustration of a plan view of the weld joint of FIG. 2;

DETAILED DESCRIPTION

Figure 4:
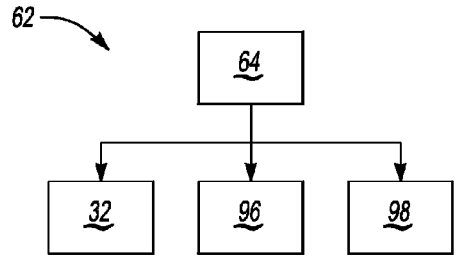
FIG. 4 is a schematic flowchart of a method of forming the weld joint of FIGS. 1-3.

Referring to the Figures, wherein like reference numerals refer to like elements, a stator 10 is shown generally in FIG. 1. The stator 10 may be useful for electromagnetic machines (not shown) for automotive applications, including alternating current induction motors. However, the stator 10 may also be useful for electromagnetic machines for non-automotive applications, including generators and electric motors for residential and industrial applications.

By way of general explanation and described with reference to FIG. 1, the stator 10 may receive a rotor (not shown) that is rotatable with respect to the stator 10 about an axis 12 of rotation of the electromagnetic machine. That is, the stator 10 may be stationary with respect to the axis 12 of rotation, and the rotor (not shown) may rotate with respect to the stator 10. In one embodiment, the stator 10 may be configured as a bar-wound stator. That is, although only shown in partial view in FIG. 1, the stator 10 may be generally configured as an annular ring and may be formed by stacking thin plates (not shown), or laminations, of magnetic steel adjacent one another to thereby form a lamination stack 14. Further, the lamination stack 14 may define a plurality of slots (not shown) disposed about the axis 12 of rotation.

Referring now to FIG. 2, the stator 10 includes a first magnet wire 16 and a second magnet wire 18. As used herein, the terminology "magnet wire" refers to electrically-conductive enamel wire formed from a conductive, ductile, non-ferrous material such as, but not limited to, aluminum or copper that is coated with an insulator 20. That is, the first magnet wire 16 may have a first core 22 formed from, for example, copper, and the first core 22 may be coated with the insulator 20 along at least a portion of the first core 22, as set forth in more detail below. Similarly, the second magnet wire 18 may have a second core 24 formed from, for example, copper, and the second core 24 may also be coated with the insulator 20 along at least a portion of the second core 24, as also set forth in more detail below. Each of the first core 22 and the second core 24 may be generally rectangular. For example, the first core 22 and the second core 24 may have a near-square shape or configuration, and may have a cross-sectional area having dimensions of from about 3.3 mm to about 3.7 mm by about 3.6 mm to about 4 mm. Alternatively, although not shown, the first core 22 and the second core 24 may be configured as a tape or may have a circular cross-section. Generally, the first magnet wire 16 and the second magnet wire 18 may have a similar configuration and may be formed from the same materials.

With continued reference to FIG. 2, the insulator 20 may be selected from any suitable electrically-insulating material. For example, the insulator 20 may be formed from a material selected from the group including enamel, paper, polymer, fiberglass, mica, and combinations thereof. In one specific example, the insulator 20 may be a polyamide-imide. Suitable examples of the first magnet wire 16 and the second magnet wire 18 are commercially available from Hitachi Cable America, Inc. of White Plains, N.Y.

Referring again to FIG. 2, the first magnet wire 16 has a first heat affectable zone 26, and a first insulator portion 28 adjacent the first heat affectable zone 26. More specifically, as best shown in FIG. 2, the first insulator portion 28 includes the insulator 20 disposed on the first core 22. In contrast, referring to FIG. 5, a portion 66 of the insulator 20 may be stripped off of the first heat affectable zone 26 such that the first core 22 is exposed, as set forth in more detail below. That is, the first heat affectable zone 26 may not include the insulator 20 disposed on the first core 22. Further, the first heat affectable zone 26 has a first distal end 30 spaced apart from the first insulator portion 28.

With continued reference to FIG. 2, as set forth in more detail below, when heat (represented generally by 80, 84, 88 in FIG. 6) is transferred to the first magnet wire 16, e.g., during welding 32 (FIG. 4) of the first distal end 30, the heat 80, 84, 88 may only be transferred to the first heat affectable zone 26. Stated differently, when heat 80, 84, 88 is transferred to the first magnet wire 16, the heat 80, 84, 88 may not be transferred to the first insulator portion 28. In particular, heat 80, 84, 88 may not be transferred to the insulator 20 disposed on the first core 22 of the first insulator portion 28.

Similarly, with continued reference to FIG. 2, the second magnet wire 18 has a second heat affectable zone 34, and a second insulator portion 36 adjacent the second heat affectable zone 34. More specifically, the second insulator portion 36 includes the insulator 20 disposed on the second core 24. In contrast, referring to FIG. 5, the portion 66 of the insulator 20 may be stripped off of the second heat affectable zone 34 such that the second core 24 is exposed. That is, the second heat affectable zone 34 may not include the insulator 20 disposed on the second core 24. Further, the second heat affectable zone 34 has a second distal end 38 spaced apart from the second insulator portion 36.

With continued reference to FIG. 2, as set forth in more detail below, when heat 80, 84, 88 (FIG. 6) is transferred to the second magnet wire 18, e.g., during welding 32 (FIG. 4) of the second distal end 38, the heat 80, 84, 88 may only be transferred to the second heat affectable zone 34. Stated differently, when heat 80, 84, 88 is transferred to the second magnet wire 18, the heat 80, 84, 88 may not be transferred to the second insulator portion 36. In particular, heat 80, 84, 88 may not be transferred to the insulator 20 disposed on the second core 24 of the second insulator portion 36.

As such, referring to FIGS. 1 and 2, since each of the first insulator portion 28 and the second insulator portion 36 includes the insulator 20, when the first magnet wire 16 is disposed adjacent to the second magnet wire 18, the first insulator portion 28 and the second insulator portion 36 may be electrically insulated from one another. In contrast, however, since the insulator 20 is not disposed on the first core 22 of the first heat affectable zone 26 and the second core 24 of the second heat affectable zone 34, respectively, the first heat affectable zone 26 may not be electrically insulated from the second heat affectable zone 34. That is, upon electrically connecting the first core 22 and the second core 24, e.g., by a weld joint 40 bridging the first distal end 30 (FIG. 2) and the second distal end 38 (FIG. 2), electrical current may be conducted between the first heat affectable zone 26 and the second heat affectable zone 34.

Referring again to FIG. 2, each of the first heat affectable zone 26 and the second heat affectable zone 34 may have a length 42 of from about 2 mm to about 7 mm. For example, the length 42 of each of the first heat affectable zone 26 and the second heat affectable zone 34 may be less than about 5 mm.

Referring to FIG. 1, it is to be appreciated that the stator 10 may include a plurality of first magnet wires 16 and a plurality of second magnet wires 18. Generally, each of the plurality of first magnet wires 16 may be disposed between two of the plurality of second magnet wires 18. Similarly, each of the plurality of second magnet wires 18 may be disposed between two of the plurality of first magnet wires 16. As such, for the stator 10, the first magnet wire 16 and the second magnet wire 18 may be disposed adjacent one another in an alternating arrangement in an annular configuration about the axis 12 of rotation.

As best shown in FIG. 1, the stator 10 may include a pattern of the first magnet wires 16 and the second magnet wires 18. That is, the stator 10 may be referred to as a bar pin stator or a bar-wound stator. More specifically, as set forth above, the first magnet wire 16 and the second magnet wire 18 may have a rectangular cross-section (not shown), may be formed from copper, and may be generally configured in a hairpin shape having a curved section (denoted generally at 58 in FIG. 1). The first and second magnet wires 16, 18 may be inserted into the aforementioned plurality of slots (not shown) defined by the lamination stack 14. After insertion, the first distal end 30 (FIG. 2) and the second distal end 38 (FIG. 2) may protrude from the lamination stack 14 and may be bent to form a wire end pair 60. In particular, the first core 22 may abut or touch the respective adjacent second core 24. That is, although not shown, the first magnet wire 16 and the second magnet wire 18 of each wire end pair 60 may contact one another at the first core 22 and the second core 24. For example, although shown separated slightly in FIGS. 2, 3, and 5 for purposes of illustration, each first magnet wire 16 may be crowded together against the respective second magnet wire 18. That is, each first magnet wire 16 of the wire end pair 60 may be aligned adjacent and in contact with the respective second magnet wire 18 of the wire end pair 60 so that the first core 22 contacts the second core 24. Therefore, for the embodiment including the plurality of first magnet wires 16 and the plurality of second magnet wires 18, each of the plurality of first magnet wires 16 and the corresponding adjacent second magnet wires 18 may be bent to form a complex weave, and thereby create a plurality of adjacent wire end pairs 60. The wire end pairs 60 may be joined by the weld joint 40 to form the aforementioned electrical connection. The resultant weave pattern and number of plurality of weld joints 40 may determine the flow of electrical current through the electromechanical device (not shown), and thus may provide a motive force of the rotor (not shown).

As shown in FIGS. 1 and 2, the stator 10 further includes the weld joint 40 joining the first magnet wire 16 and the second magnet wire 18 at only the first distal end 30 (FIG. 2) and the second distal end 38 (FIG. 2), respectively, such that the insulator 20 is not burned. That is, the first magnet wire 16 and the second magnet wire 18 may be joined or bonded by the weld joint 40 so that the insulator 20 is not burned, as set forth in more detail below. Stated differently, the weld joint 40 may be an electrically-conductive bridge or conductive cap that connects or joins together only the first distal end 30 and the second distal end 38.

Referring now to FIG. 3, the weld joint 40 may include a plurality of layers 44 formed from a weld powder 46 (FIG. 6), and stacked upon and fused to one another. By way of a non-limiting example, the weld powder 46 may be an alloy of nickel and copper. However, the weld powder 46 may have any suitable chemistry and may be selected according to the material of the first core 22 (FIG. 2) and the second core 24 (FIG. 2), and the desired operating characteristics of the stator 10 (FIG. 1).

The weld powder 46 may include a plurality of pixels 76 (FIG. 6) each having a largest dimension 78 (FIG. 6) of from about 0.5 mm to about 2 mm, e.g., about 1 mm. That is, the weld powder 46 may be a finely-granulated powder.

With continued reference to FIG. 3, the weld joint 40 may be iteratively formed so that each of the plurality of layers 44 is stacked adjacent one another. Each of the plurality of layers 44 may have a thickness 48 of from about 0.1 mm to about 0.5 mm. Further, although the weld joint 40 may have any shape or configuration, in one example, the weld joint 40 may have a substantially hemispherical configuration (shown generally at 50 in FIG. 3). Without intending to be limited by theory, the substantially hemispherical configuration 50 may maximize electrical conductivity between the first magnet wire 16 and the second magnet wire 18. The weld joint 40 may also have a height 52 of from about 1 mm to about 1.5 mm, e.g., about 1.3 mm, as measured at an apex 56 of the weld joint 40. The height 52 of the weld joint 40 may be selected to minimize heat build-up due to resistance to flow of electrical current. That is, when the height 52 is too large, e.g., greater than 1.5 mm, an increased resistance diminishes an amount of electrical current that may travel through the weld joint 40 and may contribute to heat build-up and consequent scorching, electrical shorts, and/or inefficiencies of the stator 10 and/or electromagnetic machine (not shown).

As best shown in FIG. 2, the weld joint 40 joins together only the first distal end 30 of the first magnet wire 16 and the second distal end 38 of the second magnet wire 18. That is, the weld joint 40 joins together only the first heat affectable zone 26 and the second heat affectable zone 34. Stated differently, the weld joint 40 may not join together the first insulator portion 28 and the second insulator portion 36 of the first magnet wire 16 and the second magnet wire 18, respectively. That is, the weld joint 40 may contact each of the first distal end 30 and second distal end 38 of the first magnet wire 16 and second magnet wire 18, respectively. In particular, although not shown, the weld joint 40 may include a base foundation layer that connects the first distal end 30 and the second distal end 38.

Further, as described with general reference to FIG. 2, heat 80, 84, 88 (FIG. 6) transferred during formation of the weld joint 40, e.g., during welding 32 (FIG. 4), may not be transferred to the insulator 20 disposed on the first core 22 and the second core 24 of the first magnet wire 16 and the second magnet wire 18, respectively. Therefore, for the weld joint 40, the insulator 20 is not burned. As used herein, the terminology "burned" refers to a change in shape, phase, crystallographic structure, electrical conductivity, and/or appearance of the insulator 20. For example, although not shown, a burned insulator may appear melted and/or charred, and/or may define a plurality of bubbles or blisters visible upon an exterior surface of the burned insulator. Further, without intending to be limited by theory, a burned insulator may contribute to an electrical short between the first insulator portion 28 and the second insulator portion 36, which may detrimentally affect operating performance and operating life of the stator 10 and/or electromagnetic machine (not shown). That is, a burned insulator may be electrically degraded as compared to the insulator 20, which is not burned. Advantageously, the stator 10 does not include a burned insulator.

With continued reference to FIG. 2, during operation of the stator 10, electrical current may flow from the first insulator portion 28, i.e., through the first core 22, to the first heat affectable zone 26, though the weld joint 40, through the second heat affectable zone 34, and on to the second insulator portion 36, i.e., the second core 24. That is, in operation, electrical current may flow between the first distal end 30 and the second distal end 38, and through the first magnet wire 16 and the second magnet wire 18 to thereby magnetize portions of the stator 10, cause rotation of the rotor (not shown), and thereby convert electrical energy to mechanical energy.

Referring now to FIG. 4, a method 62 of forming the weld joint 40 (FIG. 2) of the stator 10 (FIG. 1), is also disclosed herein. As best described with reference to FIG. 5, the method 62 includes removing 64 the portion 66 of the insulator 20 from each of the first core 22 of the first magnet wire 16 and the second core 24 of the second magnet wire 18 so that the first magnet wire 16 has the first heat affectable zone 26 adjoining the first insulator portion 28, and the second magnet wire 18 has the second heat affectable zone 34 adjoining the second insulator portion 36. That is, removing 64 may include separating the portion 66 of the insulator 20 from the first core 22 and the second core 24, respectively.

Figure 5:
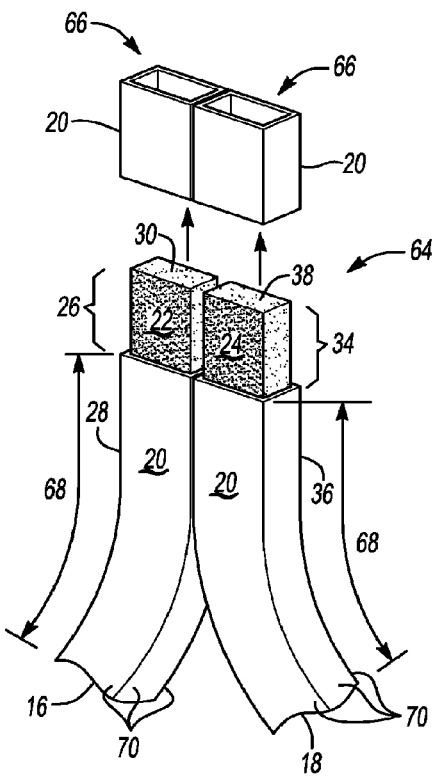
FIG. 5 is a schematic perspective fragmentary illustration of removing a portion of an insulator from a first magnet wire and a second magnet wire for the method of FIG. 4.

Referring to FIG. 5, the portion 66 of the insulator 20 may be removed from the first core 22 and the second core 24 in any suitable manner. In one embodiment, removing 64 may include stripping the portion 66 of the insulator 20 from each of the first core 22 and the second core 24 to thereby form the first heat affectable zone 26 and the second heat affectable zone 34, respectively. For example, although not shown, the first magnet wire 16 and the second magnet wire 18 may be passed through a wire stripping device (not shown) to thereby remove the insulator 20 from each of the first core 22 and the second core 24. That is, removing 64 may include exposing each of the first core 22 and the second core 24 along the length 42 (FIG. 2).

In addition, with continued reference to FIG. 5, removing 64 may further include minimizing the length 42 (FIG. 2). That is, the method 62 (FIG. 4) may include removing 64 only a relatively small portion 66 of the insulator 20 from the first core 22 and the second core 24. Conversely, the method 62 may include maximizing a total length (shown generally at 68) of the first insulator portion 28 and the second insulator portion 36, respectively, to thereby maximize a total height 54 (FIG. 1) of the lamination stack 14 (FIG. 1). Such maximized total height 54 of the lamination stack 14 and minimized length 42 of the first heat affectable zone 26 and the second heat affectable zone 34 may contribute to increased performance of the electromagnetic machine (not shown). That is, the minimized length 42 of the first heat affectable zone 26 and the second heat affectable zone 34 may allow comparatively more individual thin plates (not shown), or laminations, of magnetic steel to be stacked adjacent one another to form the lamination stack 14, which may thereby contribute to an increased power output of the electromagnetic machine (not shown).

Referring again to FIG. 4, the method 62 also includes welding 32 together only the first distal end 30 (FIG. 2) and the second distal end 38 (FIG. 2) to thereby form the weld joint 40 (FIG. 2). That is, as set forth above and described with reference to FIG. 2, the weld joint 40 joins the first magnet wire 16 and the second magnet wire 18. However, welding 32 does not transfer heat 80, 84, 88 (FIG. 6) to the first insulator portion 28 and the second insulator portion 36 sufficient to burn the insulator 20. That is, welding 32 may transfer heat 80, 84, 88 only to the first heat affectable zone 26 and the second heat affectable zone 34. It is to be appreciated that although minimal or negligible heat (not shown) may be transferred to the first insulator portion 28 and the second insulator portion 36 during welding 32, e.g., at a miniscule region (not shown) abutting the first heat affectable zone 26 and the second heat affectable zone 34, sufficient heat 80, 84, 88 may not be transferred to the first insulator portion 28 and the second insulator portion 36 to burn the insulator 20. As such, welding 32 may not change a phase of the insulator 20. For example, welding 32 may not change the insulator 20 from a solid to a liquid, i.e., may not melt the insulator 20. Additionally, welding 32 may not change the insulator 20 from a solid or liquid to a gas. That is, an exterior surface 70 (FIG. 2) of the insulator 20 may not define one or more bubbles or blisters therein. Further, welding 32 may not change a shape of the insulator 20. That is, welding 32 may not shrink or expand a dimension of the insulator 20. Additionally, welding 32 may not change an appearance of the insulator 20. That is, welding 32 may not burn, char, singe, darken, lighten, electrically degrade, and/or mar the insulator 20.

Figure 6:
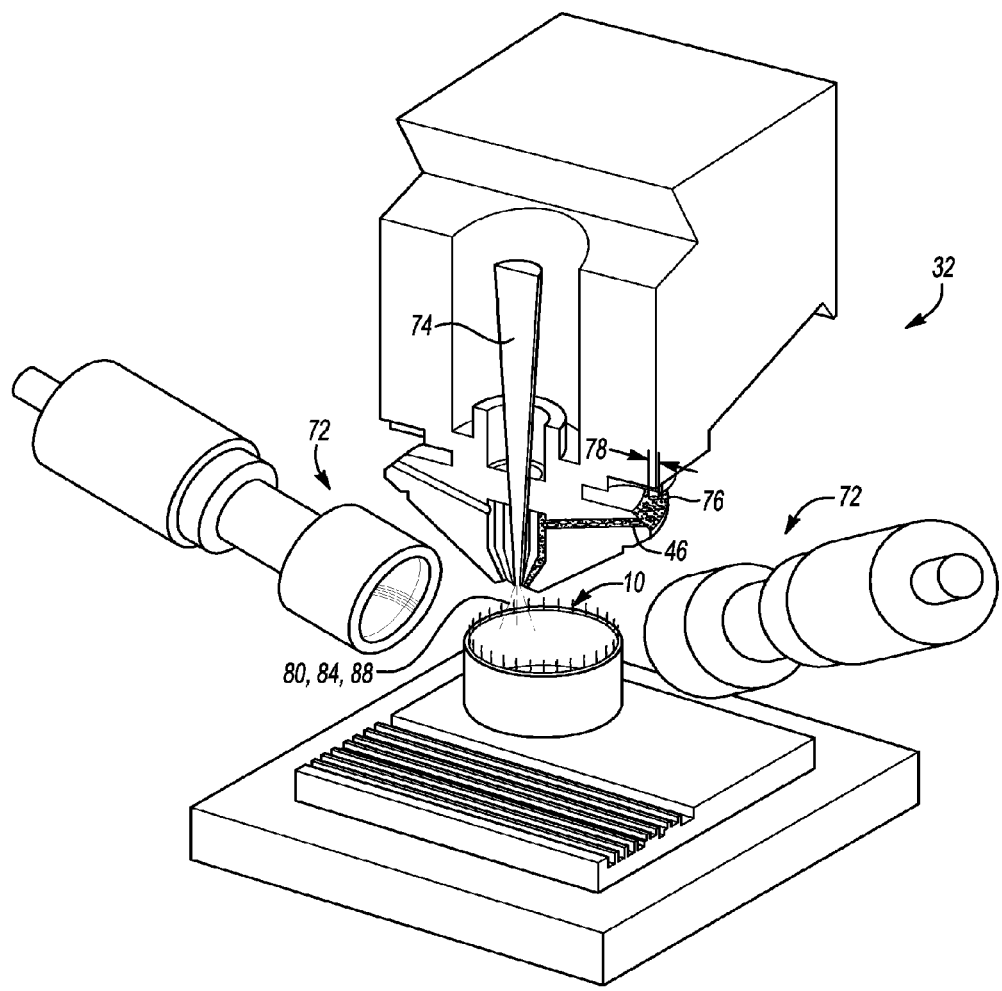
FIG. 6 is a schematic perspective illustration of a closed loop direct metal deposition system for use with an embodiment of the method of FIG. 4.

Referring now to FIG. 6, in one embodiment, welding 32 may include bonding the first distal end 30 (FIG. 2) and the second distal end 38 (FIG. 2) together by closed loop direct metal deposition. As used herein, the terminology "closed loop metal deposition" refers to an additive manufacturing method including laser-aided powdered metal fusion that is optically monitored. For closed loop metal deposition, the weld powder 46 may be melted by a diode laser 74 to form a laser-induced melt pool (not shown). Additional weld powder 46 may then be iteratively and repeatedly added to the melt pool to create the plurality of layers 44 (FIG. 3) each having the thickness 48 (FIG. 3). That is, additional weld powder 46 may be additively deposited onto the aforementioned base foundation layer (not shown) that connects the first distal end 30 and the second distal end 38. That is, the melt pool of weld powder 46 may be continuously optically monitored, iteratively augmented in exactly measured amounts, and iteratively melted to form a metallurgical bond, i.e., the weld joint 40 (FIG. 2). In particular, a closed loop optical feedback system (shown generally at 72 in FIG. 6) may continuously monitor a size of the melt pool in real time and may adjust processing variables such as flow rate of the weld powder 46 and power of the diode laser 74 to thereby additively manufacture or form the weld joint 40. As such, the method 62 (FIG. 4) may include additive welding, as set forth in more detail below.

In particular, with continued reference to FIGS. 2 and 6, welding 32 (FIG. 4) may include iteratively depositing a quantity of weld powder 46 (FIG. 6) to each of the first heat affectable zone 26 (FIG. 2) and the second heat affectable zone 34 (FIG. 2) at the first distal end 30 (FIG. 2) and the second distal end 38 (FIG. 2), respectively. That is, the weld powder 46 may be repeatedly, additively deposited onto the first heat affectable zone 26 and the second heat affectable zone 34 at the first distal end 30 and the second distal end 38, respectively, to thereby build up or additively manufacture the weld joint 40.

Figure 7:
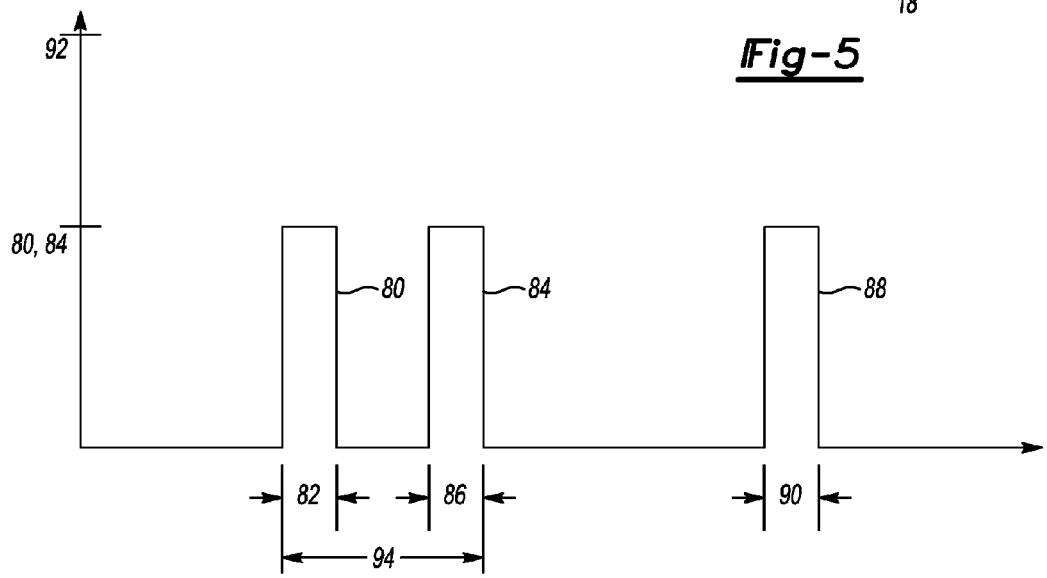
FIG. 7 is a schematic illustration of a relationship between a quantity of heat transferred and a duration of heat transferred during formation of the weld joint of FIGS. 1-3 for one embodiment of the method of FIG. 4.

Further, referring now to FIGS. 6 and 7, welding 32 (FIG. 6) may include transferring a first quantity of heat 80 (FIG. 7) to the weld powder 46 (FIG. 6) with the diode laser 74 (FIG. 6) for a first duration 82 (FIG. 7) of from about 1 second to about 5 seconds. In addition, welding 32 may further include, after transferring the first quantity of heat 80, transferring at least a second quantity of heat 84 (FIG. 7) to the weld powder 46 with the diode laser 74 for a second duration 86 (FIG. 7) of from about 1 second to about 5 seconds. It is to be appreciated that the method 62 (FIG. 4) may also include iteratively transferring one or more additional quantities of heat 88 (FIG. 7) for a respective one or more additional durations 90 (FIG. 7) to the weld powder 46. Further, although shown as having similar magnitudes, each of the quantities of heat 80, 84, 88 may have different magnitudes. That is, more or less heat 80, 84, 88 may be transferred over one duration 82, 86, 90 as compared to any other duration 82, 86, 90.

Therefore, welding 32 (FIG. 6) may include transferring a total quantity of heat 92 (FIG. 7) equal to a sum of the first quantity of heat 80 and at least the second quantity of heat 84 to the weld powder 46 (FIG. 6) over a total duration 94 (FIG. 7) of from about 2 seconds to about 10 seconds. Although not shown, it is to be appreciated that the total duration 94 may further include the one or more additional durations 90.

Moreover, with continued reference to FIGS. 6 and 7, welding 32 (FIG. 6) may further including minimizing each of the first quantity of heat 80 (FIG. 7) and at least the second quantity of heat 84 (FIG. 7). That is, welding 32 may include minimizing the individual quantity of heat 80, 84, 88 (FIG. 7) to which the weld powder 46 (FIG. 6) is exposed during one duration 82, 86, 90 (FIG. 7). For example, rather than transferring an extended pulse of heat (not shown) to the weld powder 46 or melt pool (not shown) over a total welding duration (not shown), for the method 62 (FIG. 4) disclosed herein, welding 32 may include repeatedly transferring the first quantity of heat 80 and at least the second quantity of heat 84 to the weld powder 46 over a comparatively-longer total duration 94 (FIG. 7) and a comparatively-shorter first and at least second durations 82, 86. That is, comparatively-short bursts of the first quantity of heat 80 and at least the second quantity of heat 84 may be transferred to the weld powder 46 over distinct, comparatively shorter durations 82, 86 to thereby melt the weld powder 46 and form or augment the melt pool.

As such, with continued reference to FIG. 7, although the total duration 94 may be longer than a comparative total duration of other methods, the method 62 (FIG. 4) minimizes the first quantity of heat 80 and at least the second quantity of heat 84 that ever builds up at the first and second distal ends 30, 38 (FIG. 2).

Referring again to FIG. 7, as the first quantity of heat 80 and at least the second quantity of heat 84 is transferred to, and subsequently removed from, the melt pool (not shown), e.g., by repeatedly alternatingly energizing and de-energizing the diode laser 74 (FIG. 6), the melt pool may iteratively increase to a total thickness, i.e., the height 52 (FIG. 3) of the weld joint 40 (FIG. 3), and thereby form the metallurgical bond or weld joint 40. Further, each of the first quantity of heat 80 and at least the second quantity of heat 84 transferred to the weld powder 46 (FIG. 6) may be minimized over the relatively-short first and at least second durations 82, 86 as compared to a sharp pulse of heat (not shown) over a comparatively shorter duration (not shown), i.e., about 0.2 seconds to about 0.5 seconds. Advantageously, even without the sharp pulse of heat (not shown), the method 62 (FIG. 4) forms the weld joint 40 that sufficiently joins the first distal end 30 (FIG. 2) and the second distal end 38 (FIG. 2). Stated differently, rather than transferring a comparatively large quantity of heat (not shown) to adequately melt a large portion (not shown) of weld powder 46, welding 32 (FIG. 6) may include transferring only comparatively smaller quantities of heat 80, 84, 88 to melt only a small, additive or iterative quantity of the weld powder 46 for each respective duration 82, 86, 90 until the desired height 52 (FIG. 3) of the weld joint 40 is achieved. Therefore, as set forth above, welding 32 may form the weld joint 40 having the plurality of layers 44 stacked upon and fused to one another.

Referring again to FIG. 4, the method 62 may further include, concurrent to welding 32, shaping 96 the weld joint 40 (FIG. 2) to the substantially hemispherical configuration (shown generally at 50 in FIG. 3). That is, each of the aforementioned plurality of layers 44 (FIG. 3) may be iteratively added and disposed adjacent to one another to thereby form the substantially hemispherical configuration 50. In particular, the closed loop optical feedback system 72 (FIG. 6) may monitor and adjust processing variables such as, but not limited to, the thickness 48 (FIG. 3) of each of the plurality of layers 44, a shape of the weld joint 40, a deposition speed of the weld powder 46 (FIG. 6), the first and at least second quantities of heat 80, 84 transferred to the weld powder 46, and the like, to thereby shape the weld joint 40 to the substantially hemispherical configuration 50.

With continued reference to FIG. 4, the method 62 may further include, concurrent to welding 32, clearing 98 excess weld powder 46 from each of the first distal end 30 (FIG. 2) and the second distal end 38 (FIG. 2). For example, in the event that the closed loop optical feedback system 72 (FIG. 6) detects excess weld powder 46 that is greater than an amount of weld powder 46 necessary to form a subsequent layer 44 (FIG. 3) of the weld joint 40 (FIG. 3), the excess weld powder 46 may be cleared from each of the first distal end 30 (FIG. 2) and the second distal end 38 (FIG. 2) by vacuum. That is, clearing 98 may include vacuuming excess weld powder 46 from the first and second distal ends 30, 38. Such clearing 98 may minimize excess weld powder 46 remaining on the first and second magnet wires 16, 18, which may in turn contribute to a comparatively longer operating life of the stator 10.

The aforementioned method 62 (FIG. 4) and stator 10 (FIG. 1) minimize the first and at least second quantities of heat 80, 84 required over the first and at least second durations 82, 86 for joining the first magnet wire 16 and the second magnet wire 18. That is, although the method 62 may increase the total duration 94 of welding 32 (FIG. 6), the method 62 also minimizes the individual, iterative quantities of heat, e.g., the first and at least second quantities of heat 80, 84, required for each iterative duration, e.g., the first and at least second durations 82, 86. As such, the method 62 may be described as a "low heat" and/or "additive" method 62 of forming the weld joint 40 (FIG. 2), and may be contrasted with "high heat" methods of welding such as spot tungsten inert gas (TIG) welding.

Further, the weld joint 40 (FIG. 2) formed by the method 62 (FIG. 4) exhibits excellent electrical conductivity, and as such, the stator 10 (FIG. 1) is useful for automotive applications. For example, since the insulator 20 (FIG. 2) of the first insulator portion 28 (FIG. 2) and the second insulator portion 36 (FIG. 2) is not affected by the first and at least second quantities of heat 80, 84 (FIG. 7) transferred during welding 32 (FIG. 6), the electromagnetic device (not shown) including the stator 10 is not subject to undesirable shorting. Additionally, since the length 42 (FIG. 2) of the first heat affectable zone 26 (FIG. 2) and the second heat affectable zone 34 (FIG. 2) is minimized, the method 62 enables an increased number of steel laminations within the lamination stack 14 (FIG. 1), which also contributes to an increased efficiency of the electromagnetic device.

Further, the method 62 (FIG. 4) allows for shaping 96 (FIG. 4) of the weld joint 40 (FIG. 2) to any shape that optimizes electrical conductivity between the first magnet wire 16 (FIG. 2) and the second magnet wire 18 (FIG. 2). Further, the method 62 minimizes a likelihood that excess weld powder 46 (FIG. 6) may be deposited in undesired locations of the first magnet wire 16 and the second magnet wire 18, and therefore also minimizes undesirable shorting of the electromagnetic device.

While the best modes for carrying out the disclosure have been described in detail, those familiar with the art to which this disclosure relates will recognize various alternative designs and embodiments for practicing the disclosure within the scope of the appended claims.

The invention claimed is:

1. A method of forming a weld joint of a stator, the method comprising:
   removing a portion of an insulator from each of a first core of a first magnet wire and a second core of a second magnet wire so that the first magnet wire has a first heat affectable zone and a first insulator portion adjacent the first heat affectable zone, and the second magnet wire has a second heat affectable zone and a second insulator portion adjacent the second heat affectable zone;
   wherein the first insulator portion includes the insulator disposed on the first core, and the second insulator portion includes the insulator disposed on the second core;
   wherein the first heat affectable zone has a first distal end spaced apart from the first insulator portion, and the second heat affectable zone has a second distal end spaced apart from the second insulator portion; and
   welding together only the first distal end and the second distal end to thereby form the weld joint, wherein welding does not transfer heat to the first insulator portion and the second insulator portion sufficient to burn the insulator.

2. The method of claim 1, wherein welding transfers heat only to the first heat affectable zone and the second heat affectable zone.

3. The method of claim 1, wherein welding does not change a phase of the insulator.

4. The method of claim 1, wherein welding does not change a shape of the insulator.

5. The method of claim 1, wherein removing includes stripping the portion of the insulator from each of the first core and the second core to thereby form the first heat affectable zone and the second heat affectable zone, respectively.

6. The method of claim 1, wherein each of the first heat affectable zone and the second heat affectable zone has a length of from about 2 mm to about 7 mm, and further wherein removing includes exposing each of the first core and the second core along the length.

7. The method of claim 6, wherein removing further includes minimizing the length.

8. The method of claim 1, wherein welding includes bonding the first distal end and the second distal end together by closed loop direct metal deposition.

9. The method of claim 1, wherein welding includes iteratively depositing a quantity of weld powder to each of the first heat affectable zone and the second heat affectable zone at the first distal end and the second distal end, respectively.

10. The method of claim 9, wherein the weld powder includes a plurality of pixels each having a largest dimension of from about 0.5 mm to about 2 mm.

11. The method of claim 9, wherein welding includes transferring a first quantity of heat to the weld powder with a diode laser for a first duration of from about 1 second to about 5 seconds.

12. The method of claim 11, wherein welding further includes, after transferring the first quantity of heat, transferring at least a second quantity of heat to the weld powder with the diode laser for a second duration of from about 1 second to about 5 seconds.

13. The method of claim 12, wherein welding further includes minimizing each of the first quantity of heat and at least the second quantity of heat.

14. The method of claim 12, wherein welding includes transferring a total quantity of heat equal to a sum of the first quantity of heat and at least the second quantity of heat to the weld powder over a total duration of from about 2 seconds to about 10 seconds.

15. The method of claim 13, further including, concurrent to welding, clearing excess weld powder from each of the first distal end and the second distal end.

16. The method of claim 1, further including, concurrent to welding, shaping the weld joint to a substantially hemispherical configuration.

17. A method of forming a weld joint of a stator, the method comprising:
    removing a portion of an insulator from each of a first core of a first magnet wire and a second core of a second magnet wire so that the first magnet wire has a first heat affectable zone and a first insulator portion adjacent the first heat affectable zone, and the second magnet wire has a second heat affectable zone and a second insulator portion adjacent the second heat affectable zone;
    wherein the first insulator portion includes the insulator disposed on the first core, and the second insulator portion includes the insulator disposed on the second core;
    wherein the first heat affectable zone has a first distal end spaced apart from the first insulator portion, and the second heat affectable zone has a second distal end spaced apart from the second insulator portion;
    welding together only the first distal end and the second distal end to thereby form the weld joint joining the first magnet wire and the second magnet wire;
    wherein welding does not burn the insulator and includes:
        iteratively depositing a weld powder to the first heat affectable zone and the second heat affectable zone at the first distal end and the second distal end, respectively;
        transferring a first quantity of heat from a diode laser to the weld powder for a first duration of from about 1 second to about 5 seconds;
        after transferring the first quantity of heat, transferring at least a second quantity of heat from the diode laser to the weld powder for a second duration of from about 1 second to about 5 seconds; and
        minimizing each of the first quantity of heat and at least the second quantity of heat; and
    concurrent to welding, shaping the weld joint to a substantially hemispherical configuration.

18. The method of claim 17, wherein welding forms the weld joint having a plurality of layers stacked upon and fused to one another, and further wherein each of the plurality of layers has a thickness of from about 0.1 mm to about 0.5 mm.

19. A stator comprising:
    a first magnet wire having:
        a first core;
        a first heat affectable zone; and
        a first insulator portion adjacent the first heat affectable zone and including an insulator disposed on the first core;
    a second magnet wire having:
        a second core;
        a second heat affectable zone; and
        a second insulator portion adjacent the second heat affectable zone and including the insulator disposed on the second core;
    wherein the first heat affectable zone has a first distal end spaced apart from the first insulator portion, and the second heat affectable zone has a second distal end spaced apart from the second insulator portion; and
    a weld joint joining the first magnet wire and the second magnet wire at only the first distal end and the second distal end, respectively, such that the insulator is not burned.

20. The stator of claim 19, wherein each of the first heat affectable zone and the second heat affectable zone has a length of less than about 5 mm.

* * * * *